United States Patent [19]

Yamano et al.

[11] Patent Number: 4,618,013

[45] Date of Patent: Oct. 21, 1986

[54] COMBINATION WEIGHING MACHINE WITH AUXILIARY WEIGHT HOPPER

[75] Inventors: Shoji Yamano, Akashi; Yoshitaka Mikata, Himeji; Osamu Teramoto, Akashi; Kazuhiro Nishide, Kobe, all of Japan

[73] Assignee: Yamato Scale Company, Limited, Japan

[21] Appl. No.: 698,087

[22] Filed: Feb. 4, 1985

[51] Int. Cl.$^4$ .................... G01G 19/22; G01G 13/02
[52] U.S. Cl. .......................................... 177/25; 177/1; 177/123
[58] Field of Search ............................ 177/1, 25, 123

[56] References Cited

U.S. PATENT DOCUMENTS

| | | | |
|---|---|---|---|
| 4,341,274 | 7/1982 | Hirano et al. | 177/25 |
| 4,388,975 | 6/1983 | Hirano | 177/25 |
| 4,446,937 | 5/1984 | Asai | 177/1 |
| 4,494,619 | 1/1985 | Matsuno | 177/123 X |
| 4,511,010 | 4/1985 | Sashiki et al. | 177/25 |
| 4,522,274 | 6/1985 | Konishi et al. | 177/123 X |
| 4,527,645 | 7/1985 | Sashiki et al. | 177/123 X |

Primary Examiner—George H. Miller, Jr.
Attorney, Agent, or Firm—Senniger, Powers, Leavitt and Roedel

[57] ABSTRACT

A combination weighing machine, which is used typically for packing a plurality of articles in each bag or the like so as to render the total weight of each bag to satisfy a predetermined weight condition, including a plurality of weighing units for weighing the articles each at the same time, arithmetic means for selecting some of these units the total weight of which satisfies the predetermined weight condition, means for unloading the selected weighing units for delivery of the articles for packing and then loading them with new articles, and, especially, means for adding a small quantity of articles to this system and resuming combination selecting operation when no desired combination has been obtained with the original weighing units.

5 Claims, 3 Drawing Figures

COMBINATION WEIGHING MACHINE WITH AUXILIARY WEIGHT HOPPER

This invention relates to a combination weighing machine and, especially, to such a machine having means for resuming its effective operation when no desired combination has been obtained with their weighing units.

The weighing device, which is generally referred to as "combination balance" or "combination weighing machine" is used for extracting a plurality of articles from a group of articles, such as candies, fruits or vegetables, having relatively large variance in their unit weights, to form a subgroup having a weight which is substantially equal to a predetermined target weight or, in general, which satisfies a predetermined weight condition. It includes a plurality of weighing units or balances for weighing articles each to produce a signal indicative of the weight of articles, which is hereinunder referred to as "weight signal". The weight signals are combined in accordance with a predetermined set of mathematical combinations and the weight signals of each combination are summed. These sums are compared successively with the predetermined condition, such as a specific range of weight, and a desired one of the combinations, which satisfies the condition is selected and corresponding weighing units are unloaded for delivery for packing.

In such a combination weighing machine, such an accident may occur that no desired combination is obtained during the combination selecting operation. This typically results in interruption of the machine operation. In prior art devices, it is a general practice under these circumstances to add to or remove from at least one of the weighing units a small quantity of articles by manual operation. In order to remove such troublesome and time-consuming operation, U.S. Pat. Nos. 4,341,274 and 4,446,937 disclose improved devices for effecting this articles adding or removing operation automatically. Although these patents have removed troublesome manual operation as described above, the machine operation must be interrupted until such articles adding or removing operation is completed.

Accordingly, an object of this invention is to provide an improved combination weighing machine which can resume its combination selecting operation immediately without interruption even when no desired combination has been obtained.

In accordance with this invention, a combination weighing machine comprises, in addition to an ordinary set of weighing units, an auxiliary weighing unit for weighing a small quantity of articles and producing a corresponding auxiliary weight signal and means for adding the auxiliary weight signal to the sum of ordinary weight signals when no desired combination has been obtained with the ordinary weight signals alone.

These and other objects and features of this invention will be described in more detail below in conjunction with some embodiments thereof with reference to the accompanying drawings.

Figure 1:
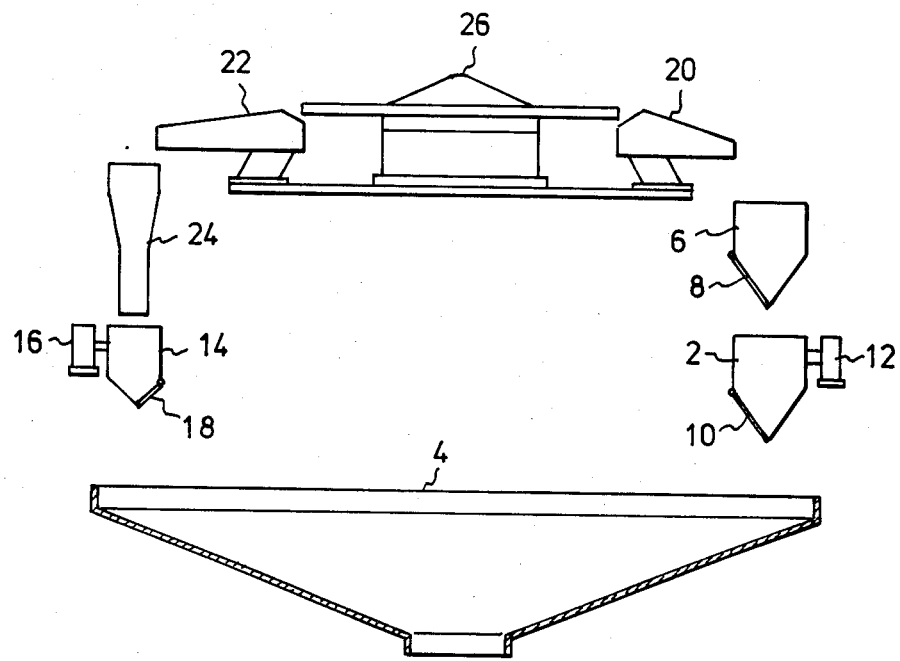
FIG. 1 is a schematic elevational view representing mechanical configuration of an essential part of an embodiment of combination weighing machine according to this invention.

Throughout the drawings, the same reference numerals are given to like structural components, and numerical suffixes 1, 2, . . . n specify components and signals relating to n-number of main weighing units of the machine, respectively.

Referring first to FIG. 1, a plurality of main weighing hoppers $2_1, 2_2, \ldots 2_n$, only one of which is shown simply as "2", are arranged around the periphery of a funnel-like collection chute 4. A loading hopper 6 is disposed just above each weighing hopper 2 for feeding articles to be weighed thereto automatically through its gate 8 when the weighing hopper has been unloaded through its gate 10. The weighing hoppers $2_1, 2_2, \ldots 2_n$ are provided respectively with weight sensors $12_1, 12_2, \ldots 12_n$, such as load cells, for sensing weights of their contents to produce electric signals (W1, W2, . . . Wn) indicative of these weights, which will be referred to as "weight signals".

In addition to these main weighing hoppers 2, as a feature of this invention, a single auxiliary weighing hopper 14 having an auxiliary weight sensor 16 and a gate 18 is disposed at the periphery of collection chute 4. Also provided is a feeding structure comprising a linear vibration feeder 20 for each loading hopper 6, an auxiliary linear feeder 22 communicating through a vertical chute 24 to auxiliary weighing hopper 14, and a central dispersion feeder 26 disposed to feed articles fed to the center of dispersion feeder 26 distributively through linear feeders 20 and 22 to hoppers 6 and 14, respectively. Such feeding structure is well known in the art and disclosed, for example, in U.S. Pat. No. 4,344,492 and opened Japanese patent specification No. 57-160021. In this invention, however, the auxiliary linear feeder 22 is arranged to feed articles which are fewer than those fed by each linear feeder 20. As illustrated in FIG. 1, auxiliary weighing hopper 14 is smaller in size and capacity than the main weighing units 2.

Figure 2:
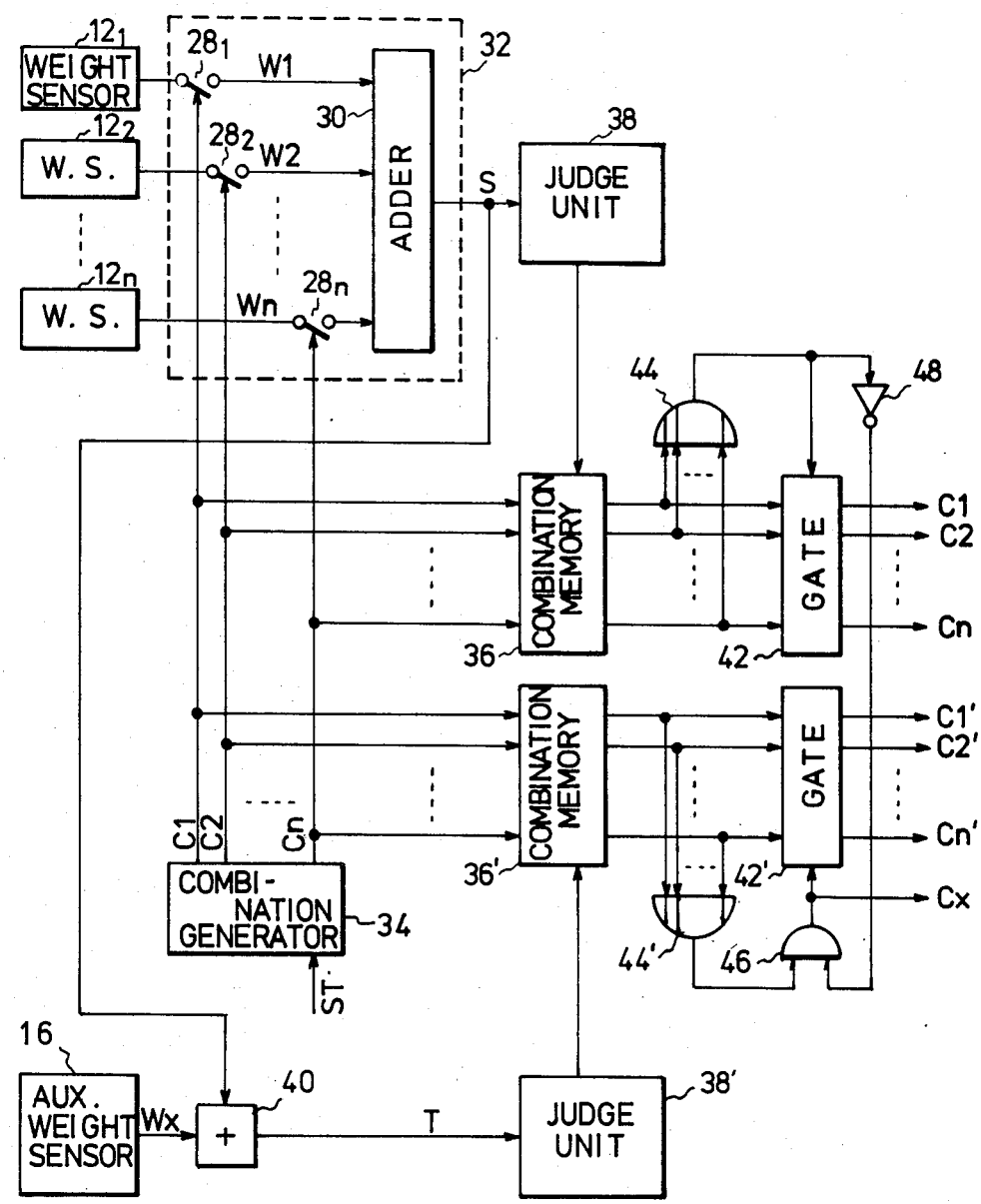
FIG. 2 is a block circuit diagram representing an Electrical configuration of the embodiment of FIG. 1.

As shown in FIG. 2, weight signals W1, W2, . . . Wn from main weighing sensors $12_1, 12_2, \ldots 12_n$ are coupled through normally-open switches $28_1, 28_2, \ldots 28_n$ to an adder circuit 30. These switches and adder circuit constitute a combination arithmetic unit 32, as so referred to below. A combination generator 34 is composed, for example, of an n-bit binary counter having n-number of bit outputs coupled respectively to control terminals of switches $28_1, 28_2, \ldots 28_n$ for providing logic "1" or "0" signal each as control signals C1, C2, . . . Cn in accordance with $(2^n - 1)$ sets of mathematical combinations. Thus, the weight signals W1, W2, . . . Wn are sequentially supplied to adder circuit 30 in these combinations. The adder circuit 30 sums the incoming weight signals to produce a sum signal S.

The outputs of combination generator 34 are also coupled to a pair of combination memories 36 and 36'. The sum signal S from combination arithmetic unit 32 (or adder 30) is supplied to judge unit 38 and also to one input of adder 40 having another input coupled to receive weight signal Wx from auxiliary weight sensor 16. The adder 40 sums both input signals to provide a total signal T to another judge unit 38'. The judge units 38 and 38' are essentially same and arranged to compare each incoming signal with a predetermined weight condition, such as an allowable range of weight, which is previously set therein, to provide an acceptance signal to each combination memory 36 or 36', when the incoming signal satisfies the condition. The combination memories 36 and 36' store the current combined input signals from combination generator 34 therein and also supply them to gate circuits 42 and 42', respectively. An enabling signal for gate circuit 42 is supplied from an OR gate 44 having inputs coupled to respective outputs of combination memory 36 and an enabling signal for gate circuit 42' is supplied from an AND gate 46 having one input coupled to output of another OR gate 44' and another input coupled to receive the output signal from OR gate 44 through an inverter 48. The OR gate 44' also has inputs coupled to respective outputs of combination memory 36'. The gate circuits 42 and 42' are enabled to open by the above enabling signals to supply control signals C1, C2, ... Cn and C1', C2', ... Cn' to an automatic unloading and loading mechanism for the gates of corresponding weighing hoppers $2_1, 2_2, \ldots 2_n$ and loading hoppers $6_1, 6_2, \ldots 6_n$. The output signal of AND gate 46 is also supplied as a further control signal Cx for controlling the gate 18 of auxiliary weighing hopper 14.

When a desired combination is obtained normally from main weight signals W1, W2, ... Wn, judge unit 38 provides an acceptance signal to combination memory 36 to cause it to provide logic signal "1" from at least one of its outputs. Therefore, the gate circuit 42 is enabled by logic "1" output of OR gate 44 to provide control signals C1, C2, ... Cn. However, inverted output of OR gate 44 inhibits AND gate 46 from producing output signal Cx to enable gate circuit 42'. Accordingly, neither control signals C1', C2', ... Cn' nor auxiliary control signal Cx appear and auxiliary weighing hopper 14 is not unloaded. However, when no desired combination is obtained with instant main weight signals, judge unit 38 produces no output signal and, therefore, no output is provided from combination memory 36. However, if the total signal T satisfies the same weight condition, judge unit 38' provides an acceptance signal to combination memory 36' to cause it to provide corresponding combined output signals. Therefore, OR gate 44' is enabled, while OR gate 44 is disabled. Consequently, AND gate 46 provides output signal Cx to open gate 42' to deliver control signals C1', C2', ... Cn' and Cx. Thus, auxiliary weighing hopper 14 is unloaded for delivery together with selected main weighing hoppers 2. Therefore, it is possible to prevent interruption of operation of the machine due to absence of desired combination in normal selection with main weight signals only. In the drawing, signal ST represents a start pulse train provided by a suitable source at a predetermined period for initiating operation of combination generator 34.

Figure 3:
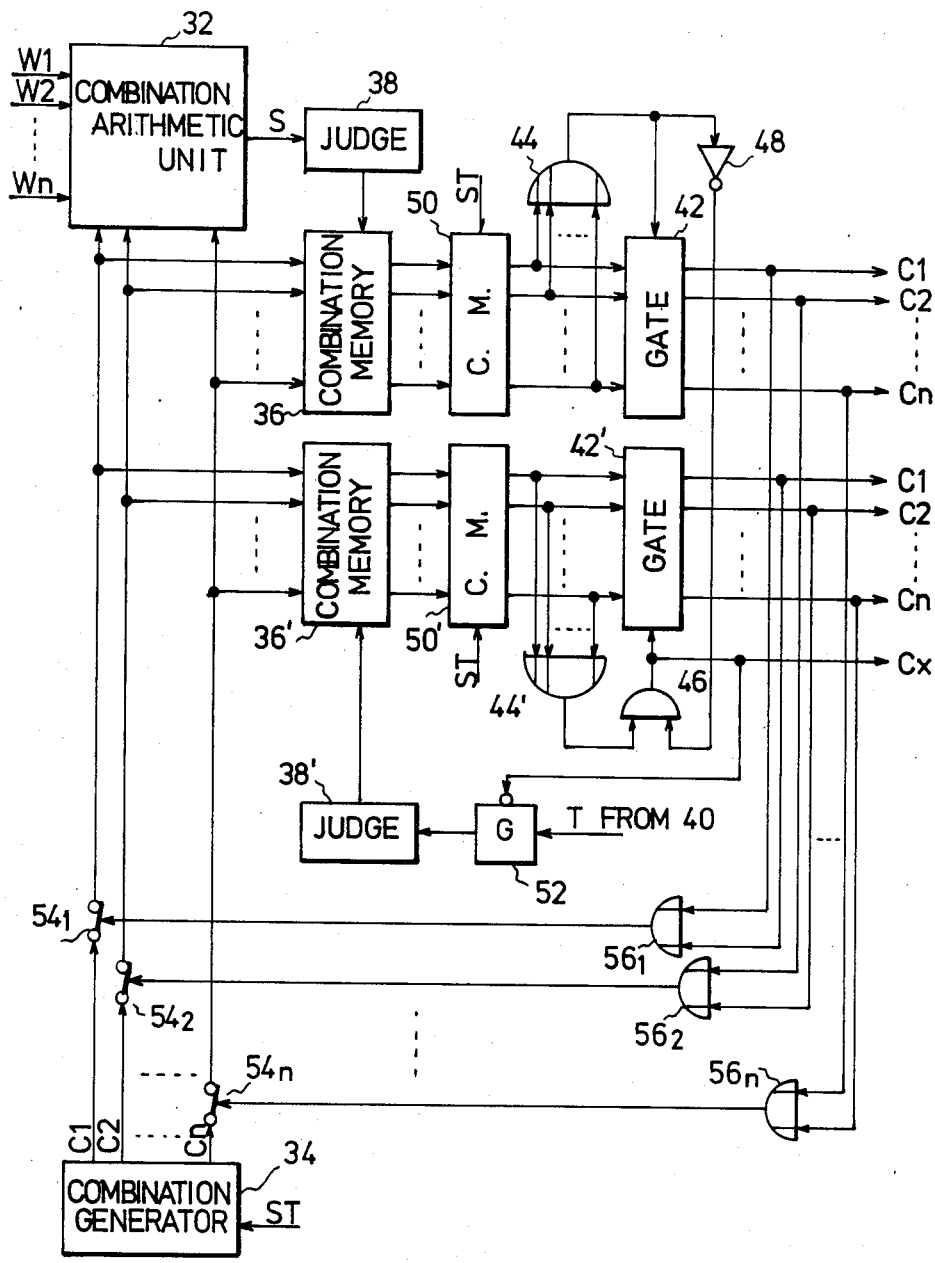
FIG. 3 is a block circuit diagram representing an another embodiment of this invention.

U.S. Pat. Nos. 4,385,671 and 4,470,166 discloses a combination weighing system which can effect a combination selecting operation only with those weight signals which have not participated in the selected combination in order to improve working efficiency by initiating the next cycle of operation before completion of unloading and re-loading operation of the selected weighing hoppers. This idea is also put in practice in the second embodiment as shown in FIG. 3. As seen from the drawing, this circuit is similar to that of FIG. 2, except that another pair of combination memories 50 and 50' are inserted between the pairs of combination memories 36 and 36' and gate circuits 42 and 42' respectively, that a gate circuit 52 which is closed by auxiliary control signal Cx is inserted between adder 40 (not shown FIG. 3) and judge unit 38', and that normally-closed switches $54_1, 54_2, \ldots 54_n$, which are arranged to respond to control signals C1 or C1', C2 or C2', ... Cn or Cn', respectively, through OR gates $56_1, 56_2, \ldots 56_n$ to open for a predetermined time (e.g., from initiation of unloading of a selected weighing hopper to stabilization of the weight signal of the re-loaded weighing hopper), are inserted between the combination generator 34 and combination arithmetic unit 32.

In operation, when a desired combination including some of weight signals W1, W2, ... Wn has been obtained, corresponding ones of control signals C1, C2, ... Cn are written in combination memory 50 through combination memory 36. Combination memory 36 is actuated by start pulse ST to supply its content to gate circuit 42 which is then opened to provide corresponding ones of control signals C1, C2, ... Cn. These control signals are applied through corresponding OR gates 56 to corresponding normally-closed switches 54 to open the same. Therefore, the corresponding output signals of combination generator 34 do not reach combination arithmetic unit 32 even though combination generator 34 starts its operation in response to srart pulse ST. Thus, the next combination selecting operation is effected with only those weight signals which have not participated in the preceding selected combination. Similar description can be applied to the operation relating to memories 36' and 50' and gate circuit 42'. In this case, however, gate 52 closed by auxiliary control signal Cx blocks total signal T from adder 40 (FIG. 2), thereby preventing actuation of combination memory 36', since auxiliary weight signal Wx is unusable in this cae due to unloading and re-loading of auxiliary weighing hopper 14 (FIG. 1). In contrast to the system of FIG. 2, the next start pulse ST can be applied without awaiting stabilization of re-loaded weighing hoppers which were selected for the preceding combination, thereby improving working efficiency of the machine.

As described above, this invention can be applied to any type of known combination weighing machine to remove unwanted interruption of operation due to absence of combination satisfying a predetermined condition.

We claim:

1. A combination weighing machine, comprising a plurality of main weighing units, means for feeding a quantity of product to each main weighing unit, each main weighing unit being adapted for weighing said quantity of product to produce a main weight signal indicative of the weight of said product, means for generating combinations of said main weight signals to select a combination whose sum satisfies a predetermined weight condition, and means for unloading the main weighing units of said selected combination; characterized in that said machine further includes at least one auxiliary weighing unit, means for feeding to said auxiliary weighing unit a quantity of product smaller than said quantity fed to a main weighing unit, each auxiliary weighing unit being adapted for weighing said smaller quantity of product to produce an auxiliary weight signal indicative of the weight of said product, means for causing said auxiliary weight signal to participate in said combinations, but only when no combination satisfying said predetermined weight condition has been obtained from the combinations of said main weight signals, and means responsive to a combination satisfying said predetermined weight condition obtained from the combinations including said auxiliary weight signal for simultaneous unloading of said auxiliary weighing unit and the main weighing units of said selected combination.

2. A combination weighing machine as set forth in claim 1 wherein said auxiliary weighing unit is smaller in size and capacity than said main weighing units.

3. A combination weighing machine comprising:
   (a) a plurality of main weighing units;
   (b) means for feeding a quantity of product to each main weighing unit, each main weighing unit being adapted for weighing said quantity of product to produce a main weight signal indicative of the weight of said quantity of product;
   (c) at least one auxiliary weighing unit;
   (d) means for feeding to said auxiliary weighing unit a quantity of product smaller than said quantity fed to a main weighing unit, each auxiliary weighing unit being adapted for weighing said smaller quantity of product to produce an auxiliary weight-indicative signal;
   (e) means for generating combinations of said main weight signals to select a combination the sum of which satisfies a predetermined weight condition and, if no combination of said main weight signals satisfies said predetermined weight condition, generating combinations of said main weight signals and said auxiliary weight signal to select a combination the sum of which satisfies said predetermined weight condition; and
   (f) means for simultaneously unloading the weighing units of said selected combination.

4. A combination weighing machine as set forth in claim 3 wherein said auxilary weighing unit is smaller in size and capacity than said main weighing units.

5. A combinatorial weighing method comprising the steps of:
   (a) feeding a quantity of product to each of a plurality of main weighing units;
   (b) feeding a quantity of product smaller than that fed to each main weighing unit to at least one auxiliary weighing unit;
   (c) effecting operation of each main weighing unit to weigh its respective quantity of product to produce a main weight signal indicative of the weight in said unit;
   (d) effecting operation of said auxiliary weighing unit to weigh said smaller quantity of product to produce an auxiliary weight signal indicative of the weight in said auxiliary unit;
   (e) generating combinations of said main weight signals to select a combination the sum of which satisfies a predetermined weight condition and, if no combination of said main weight signals satisfies said predetermined weight condition, generating combinations of said main weight signals and said auxiliary weight signal to select a combination the sum of which satisfies said predetermined weight condition; and
   (f) simultaneously unloading the weighing units of said selected combination.

* * * * *